US008676710B2

(12) United States Patent
Mane et al.

(10) Patent No.: US 8,676,710 B2
(45) Date of Patent: Mar. 18, 2014

(54) PROVIDING SECURITY IN A CLOUD STORAGE ENVIRONMENT

(75) Inventors: Nandkumar Lalasaheb Mane, Sunnyvale, CA (US); Rajashekhar Mallikarjun Arasanal, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 472 days.

(21) Appl. No.: 13/083,628

(22) Filed: Apr. 11, 2011

(65) Prior Publication Data

US 2012/0130874 A1 May 24, 2012

Related U.S. Application Data

(63) Continuation-in-part of application No. 12/951,089, filed on Nov. 22, 2010, now Pat. No. 8,601,265.

(51) Int. Cl.
*G06Q 20/00* (2012.01)
*G06F 21/30* (2013.01)

(52) U.S. Cl.
CPC ............... *G06Q 20/00* (2013.01); *G06F 21/30* (2013.01)
USPC ................................. 705/50; 705/76; 705/77

(58) Field of Classification Search
USPC ............................................. 705/50, 76, 77
See application file for complete search history.

(56) References Cited

U.S. PATENT DOCUMENTS

| 8,271,974 | B2* | 9/2012 | Mazhar et al. | 717/177 |
|---|---|---|---|---|
| 2006/0015500 | A1* | 1/2006 | Heiden | 707/9 |
| 2006/0017919 | A1* | 1/2006 | Holz et al. | 356/301 |
| 2007/0067620 | A1* | 3/2007 | Jevans | 713/156 |
| 2007/0239990 | A1* | 10/2007 | Fruhauf et al. | 713/185 |
| 2009/0049222 | A1* | 2/2009 | Lee et al. | 710/300 |
| 2010/0037296 | A1* | 2/2010 | Silverstone | 726/3 |
| 2010/0333116 | A1* | 12/2010 | Prahlad et al. | 719/328 |
| 2011/0055161 | A1* | 3/2011 | Wolfe | 707/652 |
| 2011/0167469 | A1* | 7/2011 | Letca et al. | 726/1 |
| 2011/0243553 | A1* | 10/2011 | Russell | 398/25 |
| 2012/0167197 | A1* | 6/2012 | Kruger et al. | 726/16 |

* cited by examiner

*Primary Examiner* — James D Nigh
(74) *Attorney, Agent, or Firm* — Klein, O'Neill & Singh, LLP

(57) ABSTRACT

A method of providing security as a service in a cloud storage environment includes storing, through a cloud manager of the cloud storage environment, a security level of access of a storage controller associated with a customer of the security as a service, and receiving a request from the customer to access security information of the storage controller associated therewith. The method also includes providing, through the cloud manager, security information of the storage controller associated with the customer in accordance with the request and the stored security level of access of the storage controller associated with the customer.

28 Claims, 13 Drawing Sheets

PROVIDING SECURITY IN A CLOUD STORAGE ENVIRONMENT

CLAIM OF PRIORITY

This is a Continuation in Part Application and claims priority from U.S. Utility application Ser. No. 12/951,089 titled: "METHOD AND SYSTEM FOR IMPROVING STORAGE SECURITY IN A CLOUD COMPUTING ENVIRONMENT" filed on Nov. 22, 2010.

FIELD OF TECHNOLOGY

This disclosure relates generally to cloud storage environments and, more particularly, to a method, an apparatus, and/or a system of providing security in a cloud storage environment.

BACKGROUND

In a cloud computing environment, storage requirements of one or more client device(s) may be flexibly met through a corresponding one or more storage controller(s) configured to host one or more virtual server(s) appropriately provisioned thereto. A cloud administrator may have the requisite privileges to configure a virtual server associated with a client device on any storage controller. Also, for example, the cloud administrator may accidentally or maliciously run destructive commands configured to compromise the security of data associated with the client device. An unauthorized outsider/user may also break into the system and perform the aforementioned act of malice.

Tampering of the hardware and/or software associated with a storage controller may result in a customer of the cloud service operating at the client device experiencing a compromised quality of service. To address the aforementioned problems, a set of capabilities may be defined in a role and assigned to a customer of the cloud service. Although the role-based model may provide structure, the unauthorized outsider/user may still possess the requisite means to access data associated with the customer that resides on the storage controllers. The incapability of the customer to remotely verify the integrity and the confidentiality of cloud resources (e.g., storage controller(s)) configured to process and/or store data associated therewith may imply that the customer possesses no means to ensure the integrity and the confidentiality of his/her data and the computation associated therewith.

SUMMARY

Disclosed are a method, an apparatus, and/or a system of providing security in a cloud storage environment.

In one aspect, a method of providing security as a service in a cloud environment includes storing, through a cloud manager of the cloud storage environment, a security level of access of a storage controller associated with a customer of the security as a service. The cloud manager is configured to provision storage in the cloud storage environment. The method also includes receiving a request from the customer to access security information of the storage controller associated therewith, and providing, through the cloud manager, security information of the storage controller associated with the customer in accordance with the request and the stored security level of access of the storage controller associated with the customer.

In another aspect, a method of transacting a storage security service in a cloud environment includes implementing, through a cloud manager of the cloud storage environment, security as a service in the cloud storage environment. The cloud manager is configured to provision storage in the cloud storage environment. The method also includes transmitting, to a customer of the security as a service, security information about a storage controller associated therewith in accordance with a security level of access provided thereto through the cloud manager. Further, the method includes generating, through the cloud manager, an invoice associated with the security service to the customer on a basis of an amount of security information requested thereby in accordance with the security level of access and the security information transmitted thereto.

In yet another aspect, a cloud storage environment providing security as a service includes a client device associated with a customer of the security as a service, a storage controller configured to host one or more server(s) associated with the customer, and a cloud manager configured to provision storage associated with the client device in the cloud storage environment. The cloud manager is further configured to enable storage of a security level of access of the storage controller associated with the customer in a database associated therewith, receive a request from the customer to access security information of the storage controller, and provide security information of the storage controller associated with the customer in accordance with the request and the stored security level of access of the storage controller associated with the customer.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide security as a service in a cloud storage environment. Although the present embodiments have been described with reference to specific example embodiments, it will be evident that various modifications and changes may be made to these embodiments without departing from the broader spirit and scope of the various embodiments.

Figure 1:
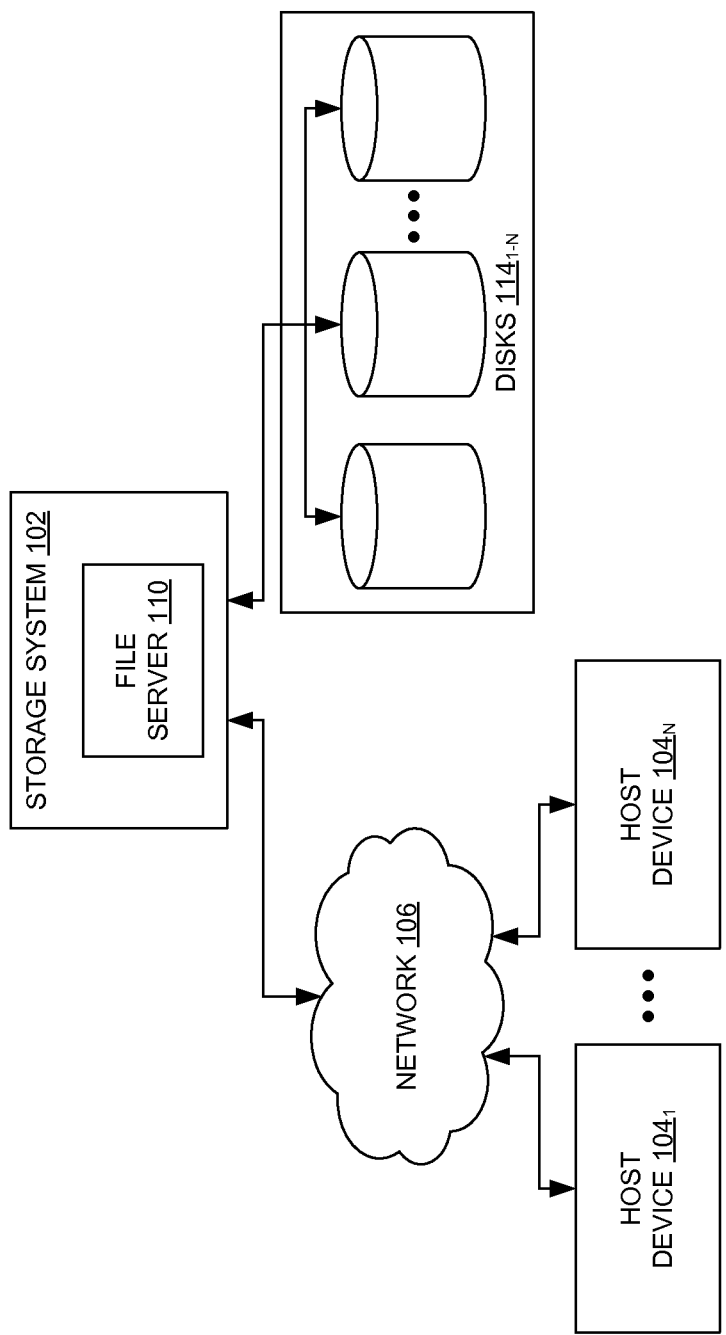
FIG. 1 is a schematic view of a storage system interfaced with a number of host devices through a network, according to one or more embodiments.

FIG. 1 shows a storage system 102 interfaced with a number of host devices $104_{1-N}$ through a network 106, according to one or more embodiments. In one or more embodiments, host devices $104_{1-N}$ may be general-purpose computing devices configured to execute applications. In one or more embodiments, network 106 may be a storage area network (SAN), a local area network (LAN), a wide area network (WAN), a virtual private network (VPN) using communication links over, for example, the Internet, or any combination thereof. In one or more embodiments, storage system 102 may directly communicate with host devices $104_{1-N}$ as a Network Attached Storage (NAS) device or a Direct Attached Storage (DAS) device. In one or more embodiments, storage system 102 may operate in a hybrid SAN-NAS environment. For example, storage system 102 may offer file-serving capabilities, and may also serve data blocks over a Fiber Channel SAN.

In one or more embodiments, host devices $104_{1-N}$ may indicate customers of services provided through network 106 or users/departments associated with an organization (e.g., an Information Technology (IT) organization). In one or more embodiments, each host device $104_{1-N}$ may have storage associated therewith. For the aforementioned purpose, in one or more embodiments, isolated logical virtual storage partitions (not shown) may be created on storage system 102 through an operating system (e.g., NetApp®'s Data ONTAP® operating system) associated therewith. In one or more embodiments, therefore, each virtual storage partition may be associated with a host device $104_{1-N}$. In one or more embodiments, information on a secured virtual storage partition may solely be accessed by the host device associated therewith.

In one or more embodiments, storage system 102 may include a storage server (e.g., file server 110) and may be associated with a set of mass storage devices (e.g., disks $114_{1-N}$). In one or more embodiments, file server 110 may be configured to receive read/write requests from host devices $104_{1-N}$ and to respond appropriately. In one or more embodiments, the requests may be directed to data stored in/to be stored in disks $114_{1-N}$. Disks $114_{1-N}$ may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data. In one or more embodiments, file server 110 may be construed as the "manager" of storage system 102. In one or more embodiments, a main purpose of file server 110 may be to provide a location or location(s) for shared disk access (e.g., shared storage of computer data) configured to be accessed by host devices $104_{1-N}$.

In one or more embodiments, the operating system associated with storage system 102 may support data sets associated with protocols including but not limited to Network File System (NFS) protocol, Common Internet File System (CIFS) protocol, Internet Small Computer System Interface (iSCSI) protocol, Hypertext Transfer (HTTP) protocol, File Transfer Protocol (FTP), FTP-Secure (FTPS) protocol, Secure File Transfer Protocol (SFTP), and Network Data Management Protocol (NDMP). In one or more embodiments, a host device $104_{1-N}$ may be configured to interact with storage system 102 according to a client/server model of information delivery. For example, host device $104_{1-N}$ may request the services of storage system 102, and storage system 102 may return the results (e.g., through packets) through network 106.

Figure 2:
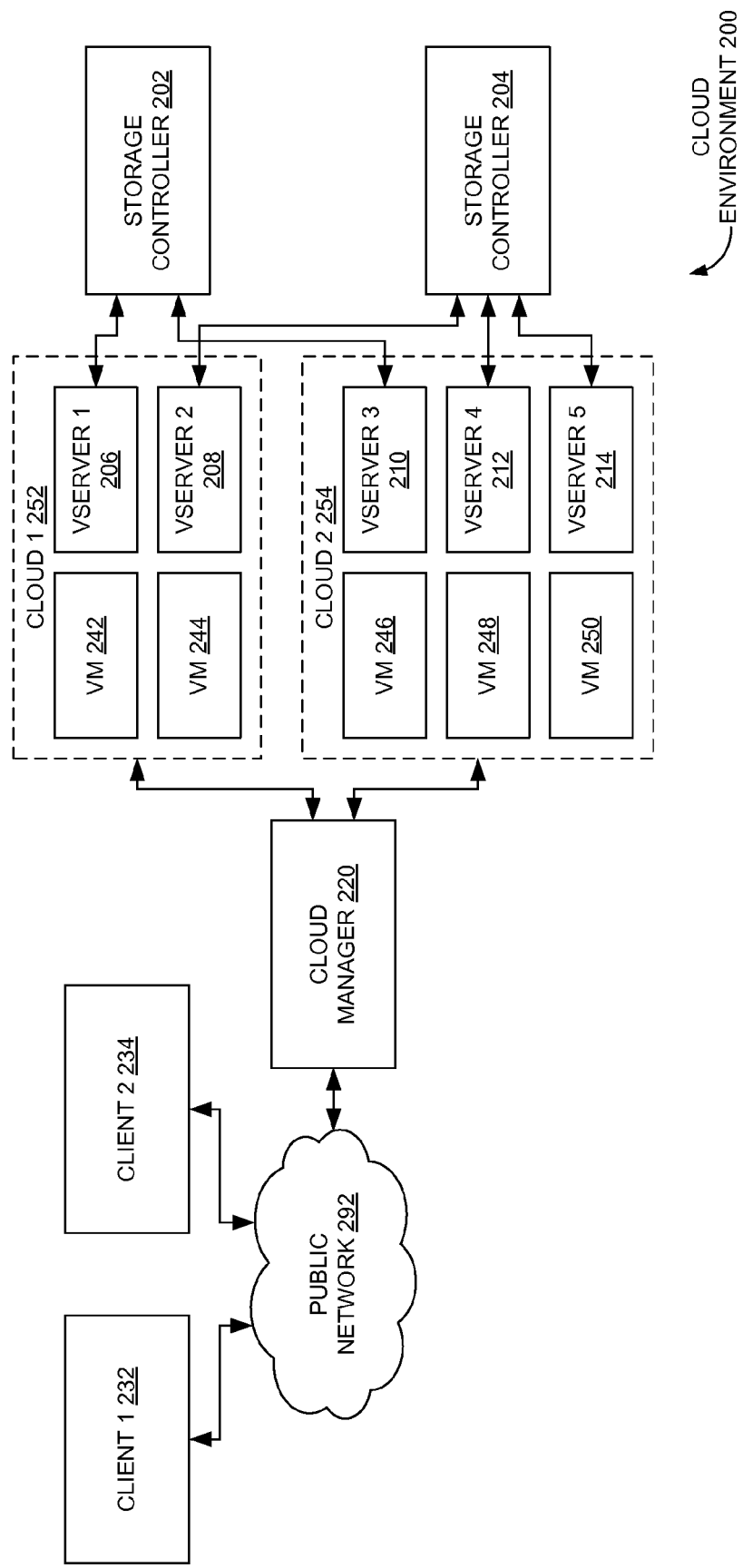
FIG. 2 is a schematic view of one or more storage controllers in a cloud environment, according to one or more embodiments.

FIG. 2 shows one or more storage controllers in a cloud environment 200 including one or more storage system(s) analogous to storage system 102, according to one or more embodiments. In one or more embodiments, cloud environment 200 may be a computing environment configured to enable network access (e.g., on-demand) to a shared pool of configurable computing resources (e.g., networks, storage, host servers, applications, services). In one or more embodiments, a storage controller may be a hardware configured to host one or more virtual servers (vservers) in cloud environment 200. In the example embodiment discussed with regard to FIG. 2, storage controller 202 may be configured to be associated with vserver 1 206 and vserver 3 210. Cloud environment 200 may include another storage controller, viz., storage controller 204, configured to be associated with vserver 2 208, vserver 4 212 and vserver 5 214. Storage controller 202 and storage controller 204 may be deployed by a cloud manager 220 and/or a cloud administrator configured to provision the host systems, storage associated with one or more client devices (e.g., client 1 232, client 2 234) and/or services requested by the one or more client devices.

In one or more embodiments, cloud manager 220 may enable the one or more client devices to self-provision computing resources thereof. In one or more embodiments, cloud manager 220 may manage cloud portion(s) (e.g., cloud 1 252, cloud 2 254) associated with client 1 232 and client 2 234. Client 1 232 and/or client 2 234 may log into a console associated with cloud manager 220 to access cloud 1 252 and/or cloud 2 254 (and virtual machines (VMs) therein) through a public network 292 (e.g., Internet). The client devices and/or VMs (as discussed below) associated therewith provided in cloud environment 200 may be analogous to host devices 104$_{1-N}$ of FIG. 1. The VMs, for example, may run applications/application programs associated with the client devices. As a VM may be a software implementation of a "physical machine," the VM may share physical resources with one or more VM(s).

In order to address storage requirements/requests associated with client 1 232 and client 2 234, cloud manager 220 may be configured to appropriately provision vserver 1 206, vserver 2 208, vserver 3 210, vserver 4 212 and vserver 5 214 and allocate to client 1 232 and client 2 234. The aforementioned vservers may be virtualized entities utilized by client 1 232 and client 2 234 to meet storage requirements thereof. Multi-tenancy may allow for a storage controller to have multiple vservers (e.g., vserver 1 206 and vserver 3 210 associated with storage controller 202, and vserver 2 208, vserver 4 212 and vserver 5 214 associated with storage controller 204) associated therewith. A portion of the cloud (e.g., cloud 1 252) including vserver 1 206, vserver 2 208 and virtual machines (VMs; e.g., VM 242, VM 244) associated therewith may be associated with client 1 232 and a portion of the cloud (e.g., cloud 2 254) including vserver 3 210, vserver 4 212 and vserver 5 214 and VMs (e.g., VM 246, VM 248, VM 250) associated therewith may be associated with client 2 234. In one or more embodiments, VMs may reside on storage exposed by vserver(s). It is obvious that physical machines may be associated with the clients (e.g., client 1 232, client 2 234) instead of VMs.

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is obvious that client 1 232 and/or client 2 234 may be entities (e.g., corporations), and that there may be a number of host devices associated with each of client 1 232 and/or client 2 234.

Cloud 1 252 and/or cloud 2 254 may span across several geographic regions. In one or more embodiments, the aforementioned cloud portions may span multiple countries under differing jurisdictional guidelines. For example, a jurisdictional guideline may deem that a vserver needs to be launched on hardware (e.g., storage controller) located in the same jurisdiction as the corresponding client(s). In one or more embodiments, administrators of cloud environment 100 may possess the authority to launch one or more vservers on any of storage controller 202 and storage controller 204, irrespective of the location(s) thereof. Further, in one or more embodiments, the aforementioned one or more vservers may be associated with one or more versions of a storage operating system (e.g., NetApp®'s Data ONTAP® operating system).

For example, an administrator may modify the version of the storage operating system and/or configuration settings on storage controller 202 and/or storage controller 204. In another example, an administrator may provision a vserver on a storage controller offering lower performance and/or located in a geographic region different from that of a client device.

Figure 3:
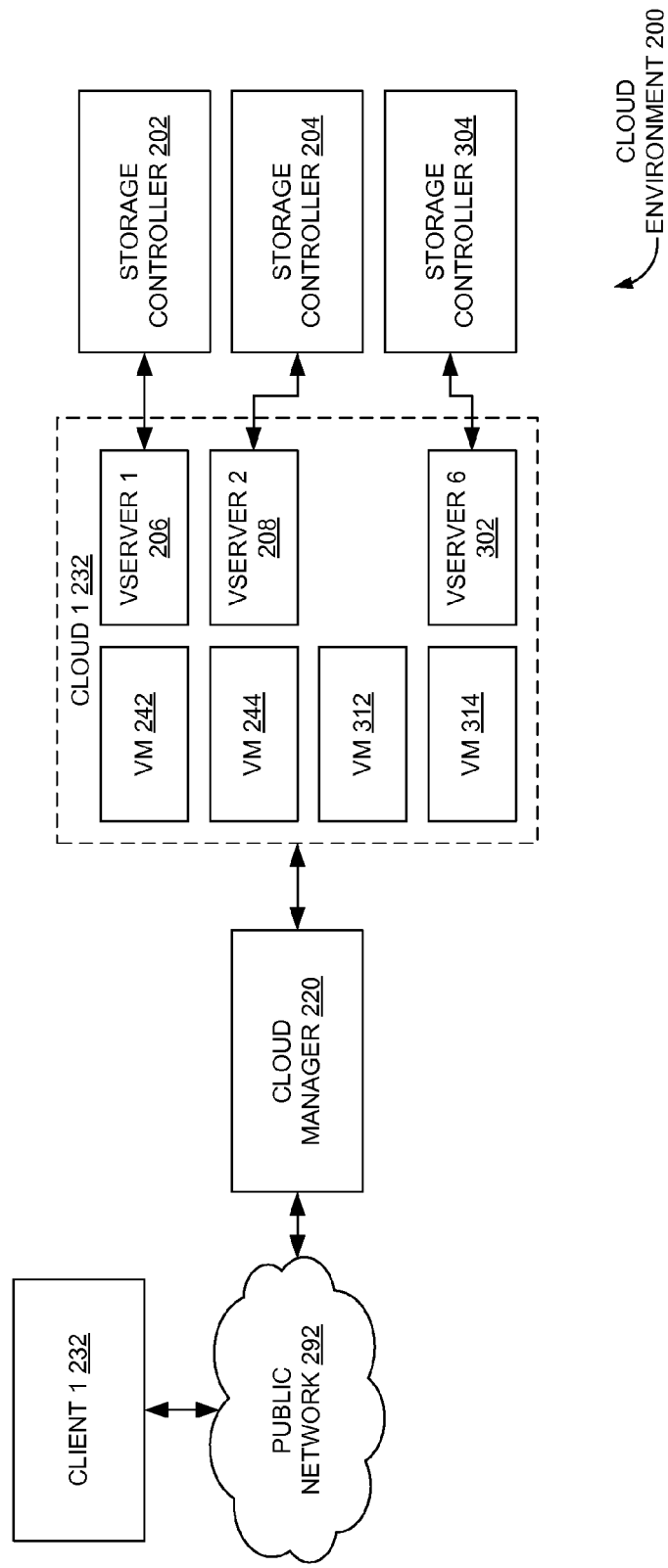
FIG. 3 is a schematic view of a virtual server in a cloud environment configured on a low-performance storage controller located in a geographic region different from that of a client device associated therewith, according to one or more embodiments.

FIG. 3 shows a vserver 6 302 configured on a low-performance storage controller 304 located in a geographic region different from that of client 1 232, according to one or more embodiments. In the example embodiment shown in FIG. 3, cloud 1 252 may include vserver 6 302 and additional VMs, viz., VM 312 and VM 314. Now, as storage controller 304 is a low-performance storage controller, storage controller 304 may not withstand a load as per a service agreement between a client (e.g., client 1 232, client 2 234) and a cloud service provider. Therefore, a denial-of-service may result therefrom. Secondly, as storage controller 304 is not in the same geographic location as client 1 232, client 1 232 may not be able to enforce jurisdictional guidelines on the cloud service provider. The aforementioned consequences merely serve as examples.

Other threats arising from the "unsecure" state of cloud environment 200 may include an administrator configuring storage through a storage controller having a tampered version of a storage operating system associated therewith and/or a tampered version of a Basic Input/Output System (BIOS) associated therewith and/or a storage controller having compromised security settings. For example, the administrator may perform configuration changes to vserver 1 206 so that client 2 234 may also access vserver 1 206. Client 1 232 may not be aware of the "unsecure" state of cloud environment 200, the "unsecure" state being caused due to at least the abovementioned reasons.

In one or more embodiments, incorporating a secure microcontroller (e.g., a Trusted Platform Module (TPM) chip) on storage controller(s) associated with the one or more client device(s) and a set of authentication protocols may enable a client device (e.g., a cloud customer) to verify the authenticity of the storage controller(s) owned by the cloud service provider. In one or more embodiments, the secure microcontroller may be configured to store authentication and/or attestation data associated with the storage controller(s), as will be discussed below. In one or more embodiments, the aforementioned data may include passwords, certificates and/or encryption keys. In one or more embodiments, the secure microcontroller may be utilized to ensure the trustworthiness of the platform associated with the storage controller through storing and comparing a platform measurement list. In one or more embodiments, the platform measurement list may be a sequence of signatures (e.g., hashes) of the set of instructions involved in the boot sequence, viz., the BIOS, the boot-loader and/or the software implementing the platform. In one or more embodiments, the secure microcontroller may utilize an RSA algorithm, a Secure Hash Algorithm (SHA; e.g., SHA-1) and/or a Hash-based Method Authentication Code (HMAC) algorithm for cryptography purposes. Thus, in one or more embodiments, the measurement list associated with the storage controller may be obtained in encrypted form at a client device.

In one or more embodiments, the secure microcontroller may not be able to control the set of instructions (e.g., software) executing on the storage controller(s). Although the secure microcontroller may be configured to store pre-runtime configuration parameters associated with the storage controller(s), policies associated with the aforementioned parameters may be determined and implemented through other applications. In one or more embodiments, the secure microcontroller may expose standard Application Programming Interfaces (APIs) configured to be utilized by an application to interact therewith.

In one or more embodiments, interfacing the secure microcontroller with the storage controller(s) may be accomplished through a permanent soldering of the motherboard associated with the storage controller hardware. In one or more embodiments, thus, a one-on-one mapping between the secure microcontroller and the platform interfaced therewith may be provided. In one or more embodiments, data bound to a particular platform may solely be accessible to that platform.

In one or more embodiments, if the data is configured to migrate to a different platform and/or if the binding conditions associated with the particular platform are not met, the data may not be accessible. In an example embodiment, when the secure microcontroller is utilized for platform attestation, a software stack associated therewith may be configured to calculate information about the platform and/or to store a measurement list associated with the storage controller in a configuration register available within the secure microcontroller.

"Signature data" may be a broad term encompassing "measurement list." Although "measurement list" is used frequently below, "measurement list" may be construed to indicate "signature data." For example, "measurement list" of a storage controller is an example of "signature data" associated with the storage controller.

Thus, in one or more embodiments, the secure microcontroller may be utilized on the storage controller(s) for platform authentication purposes. In one or more embodiments, the storage controller(s) may need to be capable of responding to requests from the client device(s) associated with authentication of the hardware. For example, the client (e.g., a customer) may want to verify specific information associated with the appropriate storage controller(s) including but not limited to the BIOS version, the storage operating system version, the configuration information and hardware identification information to ensure that data served thereto is as per the agreement with the cloud service provider.

In one or more embodiments, to enable attestation of the one or more storage controller(s) through the one or more client device(s), the one or more storage controller(s) configured to serve the one or more client device(s) may need to undergo a registration process with an authentication server configured to be set up in the cloud jointly by a client and a cloud service provider based on an agreement. In one or more embodiments, the authentication server may be based on any operating system (e.g., Microsoft®'s Windows®, Linux), and may also include a secure microcontroller. In one or more embodiments, as agreed by the client and the cloud service provider, only authorized persons may be allowed to access the authentication server. For example, A may be the cloud service provider and B may maintain the authentication server. The authentication server maintained by third-party B may be accessible both from the services side (A) and from the customer side (e.g., client).

Figure 4:
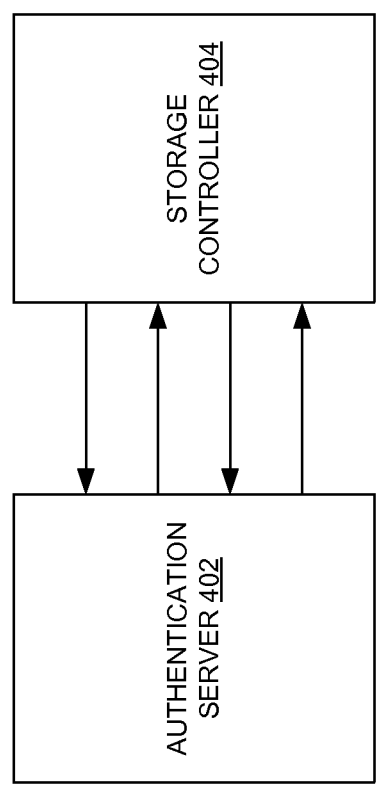
FIG. 4 is an illustrative view of the exchange of messages between an authentication server and a storage controller during the registration process of the storage controller, according to one or more embodiments.

In one or more embodiments, whenever a storage controller is added to the cloud associated with the client device (e.g., cloud 1 252 associated with client 1 232), an administrator may configure the storage controller with authentication information including an encrypted measurement list associated with the authentication server. In one or more embodiments, an administrator of the authentication server may configure the authentication server with an encrypted measurement list associated with the storage controller. In one or more embodiments, the storage controller may then undergo a registration process with the authentication server. FIG. 4 shows the exchange of messages between authentication server 402 and a storage controller 404 (analogous to the storage controllers of FIG. 2 and FIG. 3) during the registration process, according to one or more embodiments. In one or more embodiments, storage controller 404 may include a secure microcontroller (not shown) associated therewith.

In one or more embodiments, the aforementioned registration process may establish a trusted key pair, as will be discussed below. In one example embodiment, the measurement lists associated with authentication server 402 and storage controller 404 may be compared in an analogous manner to, for example, checking of passwords during a login process associated with Linux. In one or more embodiments, once storage controller 404 is attested, authentication server 402 may be configured to add storage controller 404 to a list of trusted storage controller(s) and store the trusted key pair in a memory associated therewith. In one or more embodiments, the key pairs generated during the attestation may be temporary, and authentication server 402 or storage controller 404 may have to undergo the registration process again during a reboot thereof to establish a new key pair. In one or more embodiments, if the configuration, the software and/or other attributes associated with storage controller 404 changes, the registration process may fail and the client(s) may immediately be cognizant of the change in the cloud associated therewith.

In one or more embodiments, whenever a client (e.g., a user at a client device) wants to verify the authenticity of a storage controller, a series of messages may be exchanged between the client, authentication server 402 and storage controller 404. In one or more embodiments, the client may obtain the measurement list of storage controller 404, and may verify the measurement list. In one or more embodiments, upon verification of the measurement list of storage controller 404, the authenticity of storage controller 404 may, in turn, be verified.

In one or more embodiments, the registration process may be in the form of a protocol. In one or more embodiments, discussion of the registration protocol may be carried out with reference to FIG. 4. In one or more embodiments, the registration process may commence with storage controller 404 transmitting a challenge message to authentication server 402. The challenge message may include a random number or a pseudo-random number (e.g., nonce $n_{SC}$). In one or more embodiments, authentication server 402 may now generate a private key thereof, obtain a measurement list thereof, and encrypt the data with the private key generated, along with nonce $n_{SC}$. In one or more embodiments, also, authentication server 402 may transmit a challenge to storage controller 404 with an own random number or a pseudo-random number (e.g., nonce $n_{AS}$) encrypted using the generated private key.

In one or more embodiments, storage controller 404, while generating nonce $n_{SC}$, may have generated keys therefor. Therefore, in one or more embodiments, when authentication server 402 transmits the encrypted message thereof to storage controller 404, storage controller 404 may be configured to decrypt the message using a public part of the key(s) generated during generation of nonce $n_{SC}$ and to check whether nonce $n_{SC}$ matches with a number in the encrypted message transmitted thereto. In one or more embodiments, if there is a match, storage controller 404 may be configured to check the measurement list of authentication server 402 to authenticate authentication server 402.

Now, in one or more embodiments, if authentication server 402 is authenticated (after nonce $n_{sc}$ is matched), storage controller 404 may be configured to transmit the measurement list thereof with nonce $n_{As}$ (received from authentication server 402) encrypted with the private key to authentication server 402. In one or more embodiments, authentication server 402 may be configured to decrypt the message from authentication server 402 using the public portion of the key(s) and to match a measurement list associated therewith in a database thereof. In one or more embodiments, again, authentication server 402 may be configured to match nonce $n_{AS}$ in the message received from storage controller 404. In one or more embodiments, if both result in matches, authentication server 402 may be configured to transmit a confirmation message indicating that storage controller 404 is "trusted."

Figure 5:
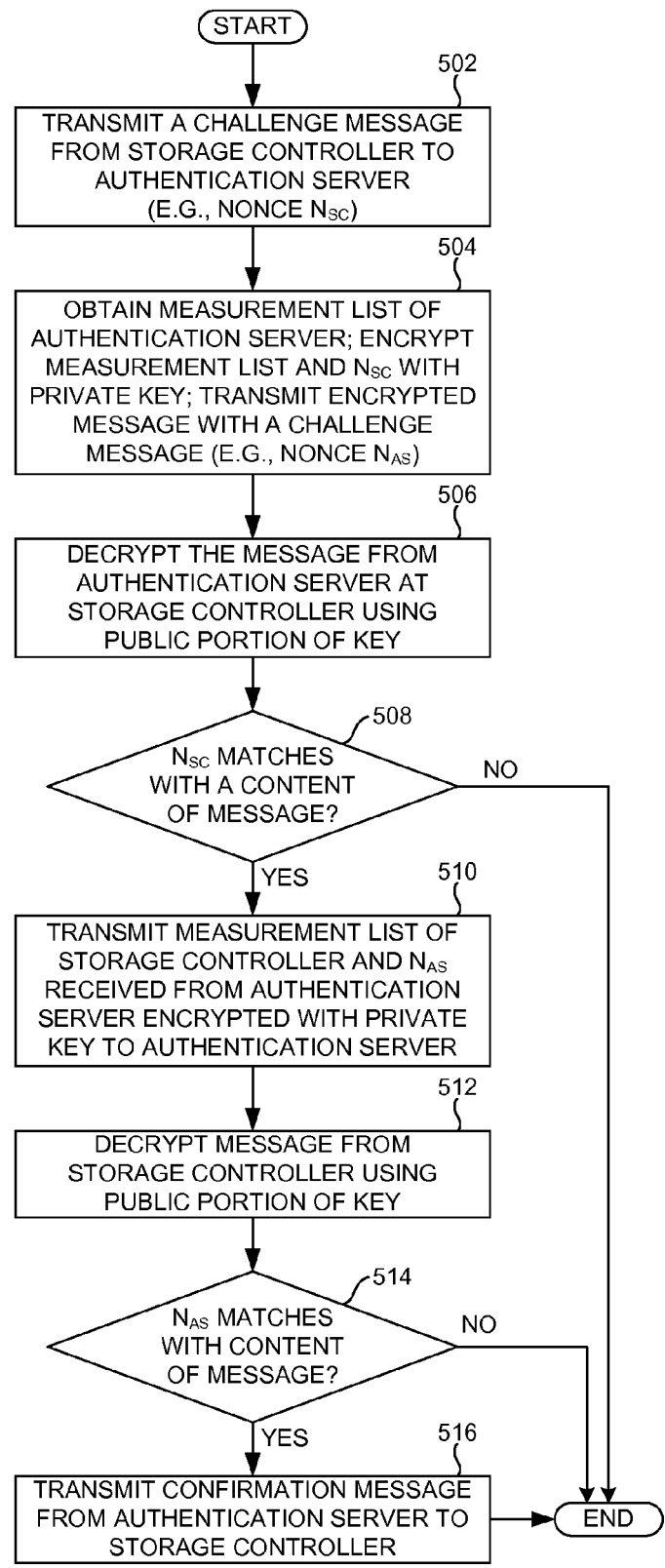
FIG. 5 is a flowchart detailing the operations involved in a process associated with registering the storage controller with the authentication server of FIG. 4, according to one or more embodiments.

FIG. 5 summarizes the aforementioned registration process, according to one or more embodiments. Specifically, FIG. 5 shows a flowchart detailing the operations involved in a process associated with registering storage controller 404 with authentication server 402. In one or more embodiments, operation 502 may involve transmitting a challenge message from storage controller 404 to authentication server 402. In one or more embodiments, the challenge message may include a nonce $n_{SC}$. In one or more embodiments, operation 504 may then involve obtaining the measurement list of authentication server 402, encrypting the aforementioned measurement list and nonce $n_{SC}$ with a private key, transmitting the encrypted message and a challenge message from authentication server 402 to storage controller 404 with a new nonce $n_{AS}$ encrypted using the private key. In one or more embodiments, operation 506 may then involve decrypting the message from authentication server 402 at storage controller 404 using the public portion of the key generated during the transmission of nonce $n_{SC}$ therefrom.

In one or more embodiments, operation 508 may then involve checking as to whether nonce $n_{SC}$ transmitted from storage controller 404 matches with a content of the message received from authentication server 402. In one or more embodiments, the measurement list of authentication server 402 may also be checked to authenticate authentication server 402. In one or more embodiments, if there is a match of $n_{SC}$, operation 510 may then involve storage controller 404 replying with a measurement list thereof and nonce $n_{AS}$ received from authentication server 402 encrypted with the private key to authentication server 402 as a message.

In one or more embodiments, authentication server 402 may then be configured to decrypt the message from storage controller 404 using the public portion of the key(s) in operation 512. In one or more embodiments, operation 514 may involve checking as to whether nonce $n_{AS}$ first transmitted from authentication server 402 matches with a content of the message received from storage controller 404. In one or more embodiments, the measurement list of storage controller 404 may also be matched with a database at authentication server 402. In one or more embodiments, following a match of nonce $n_{AS}$ and the measurement list of storage controller 404, operation 516 may involve transmitting a message from authentication server 402 to storage controller 404 indicating that storage controller 404 is "trusted." In one or more embodiments, in case of failures associated with the nonce matches, an error message (e.g., "registration failure") may be generated.

Figure 6:
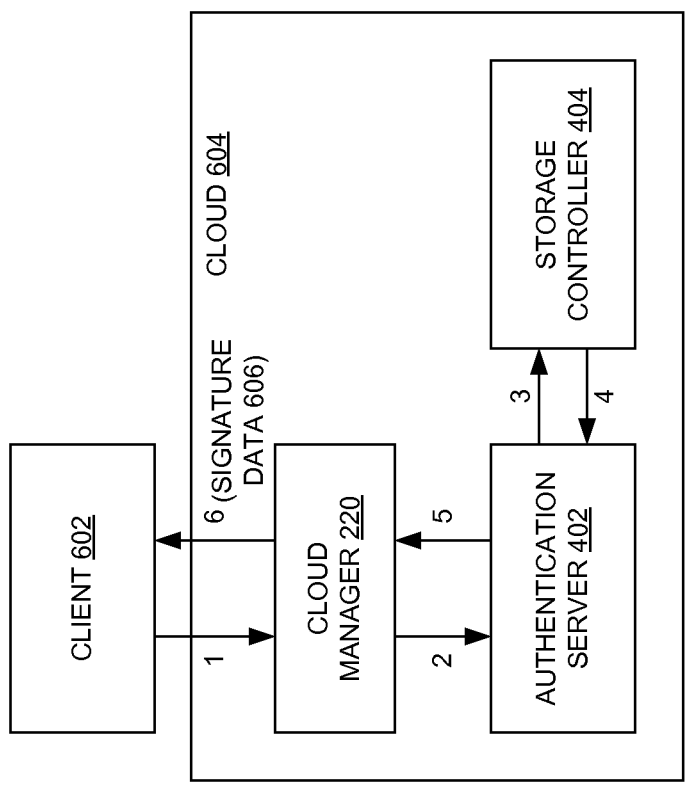
FIG. 6 is an illustrative view of the exchange of messages between a client device, a cloud manager, the authentication server of FIG. 4 and the storage controller of FIG. 4, according to one or more embodiments.

As discussed above, in one or more embodiments, when a client wants to verify the authenticity of storage controller 404, a series of messages may be exchanged between the client, authentication server 402 and storage controller 404. FIG. 6 illustrates the exchange of messages between client 602 (analogous to client 1 232 and client 2 234), cloud manager (e.g., cloud manager 220), authentication server 402 and storage controller 404. In one or more embodiments, cloud manager 220, authentication server 402 and storage controller 404 may be part of a cloud 604. As shown in FIG. 6, numbers 1-6 along the arrows between client 602, cloud manager 220, authentication server 402 and storage controller 404 may indicate a sequential order to data flow associated with cloud 604.

In one or more embodiments, client 602 may initiate an authentication request to cloud manager 220. In one or more embodiments, cloud manager 220 may then request authentication server 402 for purposes of attesting storage controller 404. In one or more embodiments, authentication server 402 may then transmit an authentication request to storage controller 404 with a nonce $n_{AS}$ (may/may not be the same as $n_{AS}$ discussed with regard to FIG. 5) and a measurement list thereof encrypted using the private key established during the registration process discussed with regard to FIG. 4 and FIG. 5. In one or more embodiments, storage controller 404 may then be configured to decrypt the message transmitted from authentication server 402 using the public portion of the key shared between authentication server 402 and storage controller 404 and to verify the measurement list of authentication server 402. In one or more embodiments, storage controller 404 may also transmit a measurement list thereof and the challenge message with the nonce $n_{AS}$ encrypted using the private key thereof.

In one or more embodiments, authentication server 402 may then be configured to decrypt the message from storage controller 404 using the public key shared therebetween. In one or more embodiments, if $n_{AS}$ matches with the challenge message previously transmitted from authentication server 402 and if the measurement list of storage controller 404 matches with the stored copy at authentication server 402, authentication server 402 may be configured to transmit a message to storage controller 404 indicating that storage controller 404 is "trusted," as discussed above.

In one or more embodiments, cloud manager 220 may then transmit the signature data (e.g., measurement list; shown as signature data 606 (obtained in sequence 6) in FIG. 6) of storage controller 404 to the client. In one or more embodiments, thus, the client may be able to verify the integrity of storage controller 404 (e.g., storage controller 202) configured to host one or more vserver(s) (e.g., vserver 1 206) associated with the client (e.g., client 1 232).

Figure 7:
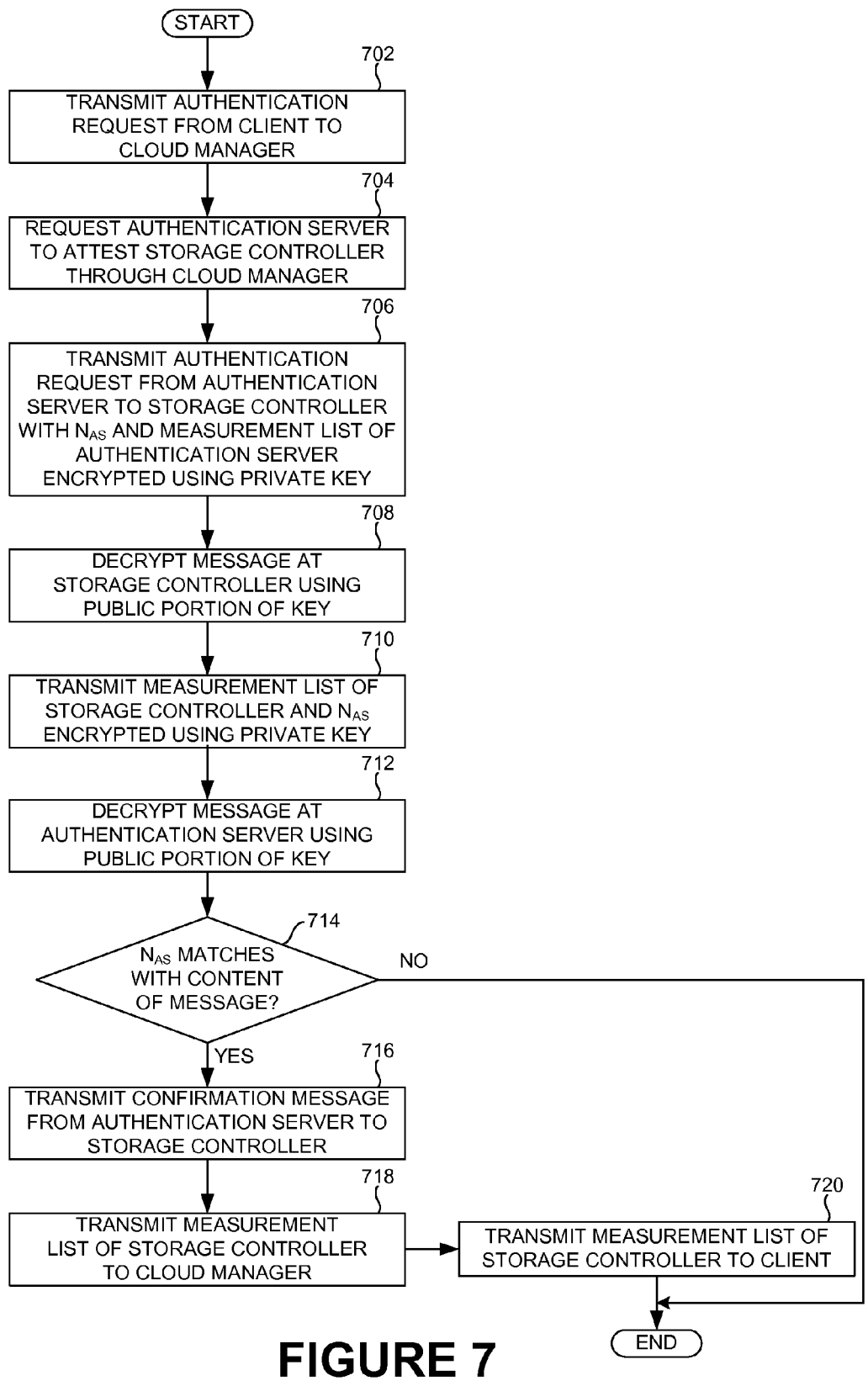
FIG. 7 is a flowchart detailing the operations involved in a method of verifying the authenticity of the storage controller of FIG. 4 through a client device, according to one or more embodiments.

FIG. 7 summarizes the abovementioned authentication process, according to one or more embodiments. Specifically, FIG. 7 shows a flowchart detailing the operations involved in a method of verifying the authenticity of storage controller 404 through client 602, according to one or more embodiments. In one or more embodiments, operation 702 may involve transmitting an authentication request from client 602 to cloud manager 220. In one or more embodiments, operation 704 may then involve requesting, through cloud manager 220, authentication server 402 to attest storage controller 404. In one or more embodiments, operation 706 may then involve transmitting an authentication request from authentication server 402 to storage controller 404 with a nonce $n_{AS}$ and a measurement list of authentication server 402 encrypted using the private key established during the registration process discussed above.

In one or more embodiments, operation 708 may involve decryption of the message transmitted from authentication server 402 at storage controller 404 using the public portion of the key. In one or more embodiments, the measurement list of authentication server 402 may also be verified at storage controller 404. In one or more embodiments, operation 710 may then involve transmitting, from storage controller 404 to authentication server 402, the measurement list of storage controller 404, along with nonce $n_{AS}$ associated with the previous transmission from authentication server 402, encrypted using the private key thereof.

In one or more embodiments, operation 712 may involve decrypting the message from storage controller 404 at authentication server 402 using the public portion of the key. In one or more embodiments, operation 714 may involve verifying as to whether a content of the message matches with nonce $n_{AS}$ transmitted first from authentication server 402 to storage controller 404. In one or more embodiments, the measurement list of storage controller 404 may also be verified for a match with the stored copy at authentication server 402. In one or more embodiments, if both are matches, operation 716 may involve transmitting a message from authentication server 402 to storage controller 404 indicating that storage controller 404 is "trusted."

In one or more embodiments, operation 718 may then involve transmitting the measurement list of storage controller 404 from authentication server 402 to cloud manager 220. In one or more embodiments, operation 720 may involve transmitting the measurement list of storage controller 404 to client 602 (e.g., client 1 232). In one or more embodiments, if the abovementioned nonce match fails, an error message (e.g., "authentication failure") may be generated.

Figure 8:
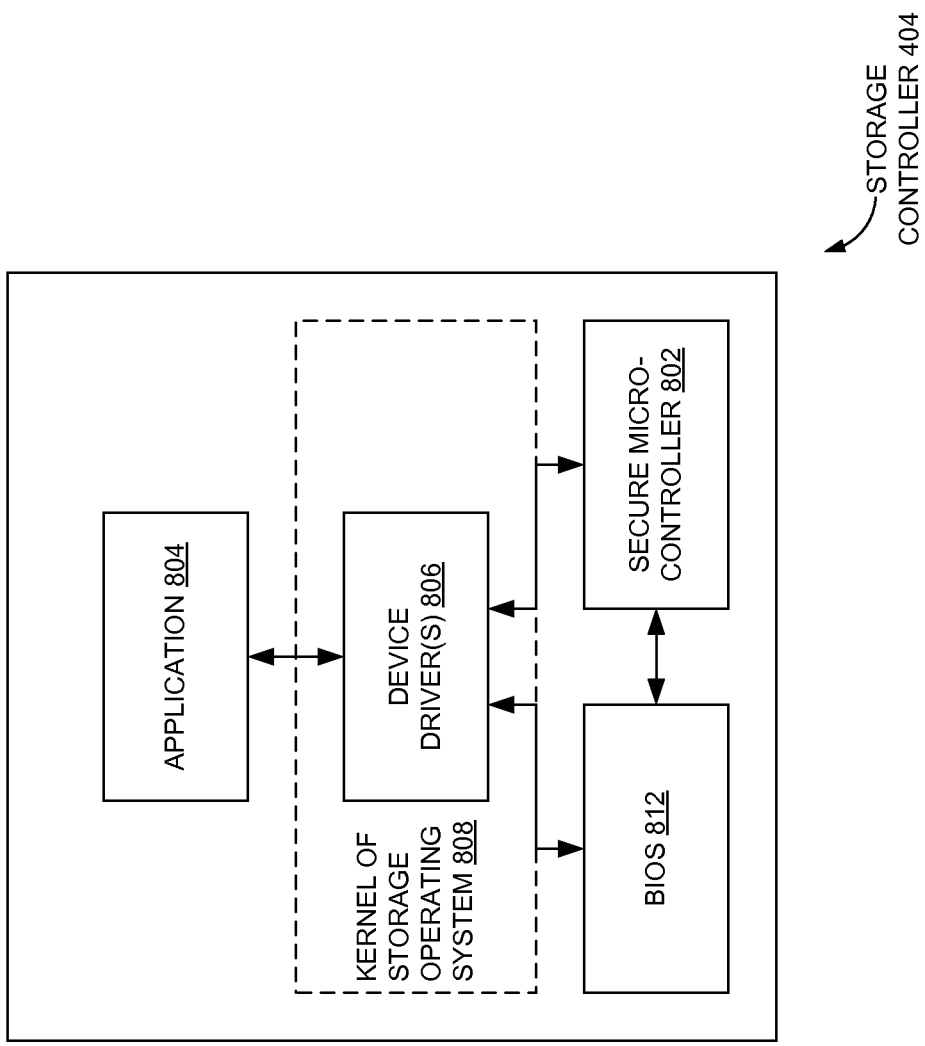
FIG. 8 is a schematic view of a secure microcontroller interfaced with the storage controller of FIG. 4, according to one or more embodiments.

FIG. 8 shows the secure microcontroller (e.g., secure microcontroller 802) discussed above interfaced with storage controller 404, according to one or more embodiments. In one or more embodiments, secure microcontroller 802 may be incorporated on a motherboard associated with storage controller 404. In one or more embodiments, the BIOS (e.g., BIOS 812) on storage controller 404 may be upgraded such that the BIOS is aware of the hardware associated with secure microcontroller 802. In one or more embodiments, applications 804 associated with storage controller 404 may be written such that applications 804 are secure microcontroller 802 aware. In one or more embodiments, a secure microcontroller aware application 804 may communicate with authentication server 402 for purposes of authentication and attestation, which are discussed above.

In one or more embodiments, secure microcontroller aware application 804 may also communicate with secure microcontroller 802 and BIOS 812 of storage controller 404 through device driver(s) 806 written therefor for purposes of storing and retrieving security data (e.g., keys, platform measurement list(s)). In one or more embodiments, device driver(s) 806 may be a part of the kernel associated with storage operating system 808 configured to execute on storage controller 404.

When one or more storage controller(s) are associated with a cloud, the exemplary embodiments discussed above may aid in a customer (e.g., client) of the cloud remotely verifying that the one or more storage controller(s) are "trustworthy." In one or more embodiments, the cloud customer may verify attributes of the one or more storage controller(s) such as the BIOS version, the operating system version and/or physical hardware identification attributes. In one or more embodiments, thus, customers seeking sensitivity/security of data may consider opting for cloud computing to meet storage requirements thereof.

In one or more embodiments, as discussed above, secure microcontroller 802 may be a TPM chip. Therefore, in one or more embodiments, cloud customers may utilize software configured to communicate with the servers having TPM modules associated therewith to fetch information associated with the hosts. As TPM modules have found wide technological use, already existing software may be remodeled quickly in order to verify authenticity of the one or more storage controller(s). Thus, the exemplary embodiments may provide for a consistent and secure cloud computing system, which may be completely TPM based.

It is obvious that the capability of the client(s) to query the one or more storage controllers(s) to obtain a measurement list is the same as the capability of the client(s) to query the vserver(s) associated with the one or more storage controller(s) to obtain the measurement list. Further, it is obvious that the measurement list of storage controller 404 may also be transmitted to a client device periodically without the client device querying storage controller 404.

In one or more embodiments, cloud service providers may have service agreements (e.g., Service Level Agreements (SLAs)) for users in the cloud environment to provide flexibility in the number of servers associated with each of the users, availability (e.g., to address persistent storage use, amount of storage use) of storage to each of the users, network performance (e.g., jitter, latency, packet loss), engineering support, cloud monitoring (e.g., providing resource usage statistics, demand patterns, metrics such as processor utilization, memory utilization etc. to each of the users) and auto-scaling (e.g., during heavy usage) of the cloud associated with a user. Thus, the cloud service providers may provide services associated with a tiered network service, tiered performance, tiered storage space, tired cloud monitoring service, tiered engineering support, tiered cloud auto-scaling, and/or tiered server utilization to the users in accordance with service agreement(s).

In one or more embodiments, the abovementioned security of the cloud environment may also be provided as a service agreement (e.g., SLA) between a service provider and a user in the cloud environment. In one or more embodiments, the service agreement may be associated with the service provider providing tiers (e.g., price dependent) of service to the user. In one or more embodiments, as part of the service agreement, user authentication may be provided based on the necessity and the type thereof. It is obvious that the cloud user may refer to the consumers of entities provisioned inside the cloud (e.g., client 602; analogous to client 1 232 and client 2 234). For example, the consumers may be 100 engineers requesting for VMs having 1 GB of Random Access Memory (RAM) associated therewith in a cloud environment (e.g., cloud environment 200). The cloud access of the aforementioned consumers may be managed at the client side through one or more system administrator(s), who may possess the privileges to request the cloud manager (e.g., cloud manager 220) for the 100 VMs.

In the abovementioned example, the need for user authentication may be decided through the one or more system administrator(s) at the client side. The one or more system administrator(s) may opt for user authentication to verify details of the consumer(s) logged in and/or the activity thereof.

The secure microcontroller (e.g., secure microcontroller 802; TPM) discussion associated with FIG. 8 is an example of hardware based user authentication. For example, secure microcontroller 802 may communicate with authentication server 402 for purposes of authentication and attestation. In one or more embodiments, the hardware based authentication may be preferable to a software based authentication (e.g., through Secure Shell (SSH); public-key cryptography) implemented in the cloud environment because the software based authentication is performed using the central processor (e.g., Central Processing Unit (CPU)) associated with storage controller 404 and the hardware based authentication is performed utilizing secure microcontroller 802, thereby freeing the central processor for other important tasks. However, as exemplary embodiments discussed herein are directed to security based service agreement(s) in the cloud environment, it is obvious that the software based authentication also is within the scope thereof.

Thus, in one or more embodiments, both hardware based authentication and software based authentication may be provided as options to the customer (the user), who may choose one over the other based on need, preference and/or available budget. In one or more embodiments, the service provider may bill the user on the basis of the type of authentication. For example, hardware based authentication may be priced higher than software based authentication because of the involvement of a separate secure microcontroller 802 therefor.

In one or more embodiments, the platform attestation process may also come under the purview of the service agreement. In one or more embodiments, the platform attestation process associated with a storage controller may result in an attestation success/failure indication. In one or more embodiments, through the platform attestation process, the cloud user may attest to the platform on which data associated therewith is configured to be stored. In one or more embodiments, the platform attestation may verify as to whether all applications are executing on the same platform in accordance with the service agreement between the cloud service provider and the cloud user, and whether there are any violations/threats including but not limited to degraded performance and data migration outside the platform agreed to. In one or more embodiments, the platform attestation may also ensure that the software stack associated with the "storage system" of the cloud user and/or the configuration parameter(s) associated with storage controller 404 are not erroneously or maliciously modified (e.g., by cloud administrator(s)).

Thus, in one or more embodiments, as per the service agreement between the cloud user and the service provider, the user may pay to receive the attestation success/failure confirmation. In one or more embodiments, as part of the platform attestation process, the cloud user may receive an encrypted form of signature data (e.g., measurement list discussed above) of storage controller 404 associated therewith. In one or more embodiments, the aforementioned signature data reception may, again, be dependent on the service agreement between the cloud user and the service provider. In one or more embodiments, based on the price-based service model available to the cloud user, a user who pays the minimum may merely receive the attestation success/failure confirmation. In one or more embodiments, a user who pays more may receive the encrypted form of signature data and other parameters based on the price-based service model.

In one or more embodiments, as discussed above, the signature data may be the measurement list associated with storage controller 404. In one or more embodiments, again as discussed above, the measurement list may be a sequence of hashes of the set of instructions involved in the boot sequence, viz., the BIOS, the boot-loader and/or the set of instructions (e.g., software) implementing the platform. In one or more embodiments, the measurement list may be in an encrypted form, and may be obtained at a client device as discussed with reference to FIG. 6. In one or more embodiments, the cloud user may decrypt the signature data (e.g., measurement list) to allow for comparison/verification thereof with the configuration agreed to with the service provider. Thus, in one or more embodiments, validity of the signature data and/or security may be verified therethrough. For example, the user may be able to check whether the cloud administrator has tampered with the configuration of storage controller 404 associated therewith.

In one or more embodiments, as discussed above, the platform attestation process may also yield signature data of storage controller 404 based on the service agreement between the user and the service provider. In one or more embodiments, the cloud user may choose different parameters of the signature data (e.g., measurement list) based on requirement, necessity, budget and/or preference. In one or more embodiments, the service provider may bill the cloud user on the basis of the number of parameters and the type of parameters opted for, as will be discussed below. In one or more embodiments, the cloud user may request for parameters other than the parameters associated with the signature data of storage controller 404, depending on the price-based service model. In one or more embodiments, the parameters other than the parameters associated with the signature data may include but are not limited to one or more configuration file(s) and storage system information.

In an example scenario, a user may have agreed to an operating system version associated with the vserver(s) through another service agreement. On top of the aforementioned service agreement, the user may subscribe to security service(s) in the cloud environment. The user, therefore, may be able to query cloud manager 220 to obtain data associated with the security service(s). As per subscription to the user authentication process, the user may be able to verify if the operating system associated therewith is the same. However, if the operating system (e.g., NetApp®'s Data ONTAP® operating system) version changes, the user may only be able to obtain information regarding the "new" version of the operating system through subscribing to the service associated with receiving appropriate parameters along with the encrypted signature data.

In one or more embodiments, different levels of checking with authentication server 402 may be priced differently. For example, at the bare minimum level, only the operating system version may be checked for. At higher levels, the user/customer may be able to obtain information regarding the BIOS, the hardware configuration, the checksum of all executable files etc. In one or more embodiments, the difference in pricing between lower levels of security and higher levels may be due to more of the infrastructure associated with the service provider being involved in service(s) associated with the higher levels than the lower levels.

Figure 9:
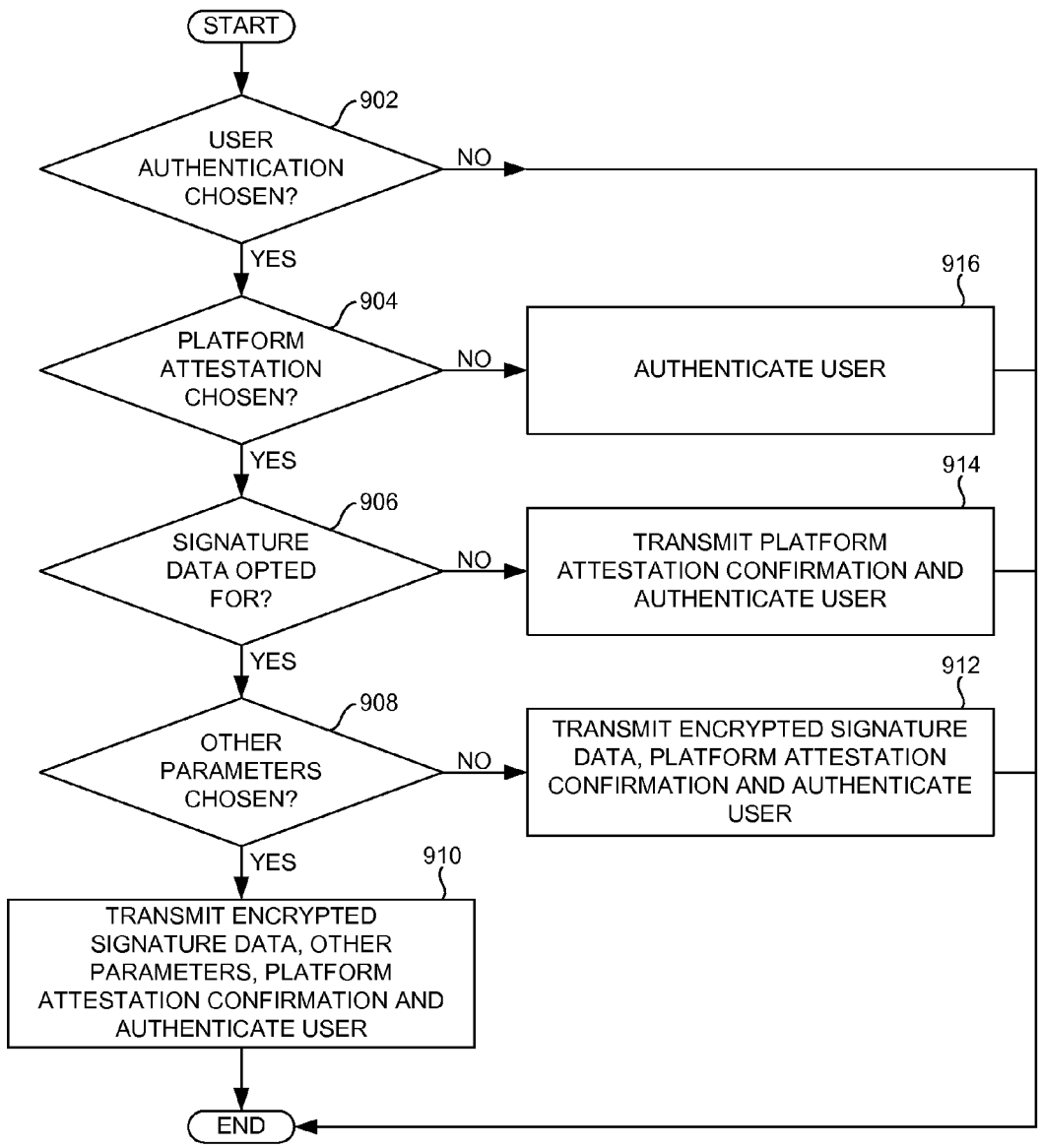
FIG. 9 is a flowchart detailing the operations involved in providing security to a cloud user based on a service chosen, according to one or more embodiments.

FIG. 9 shows a flowchart detailing the operations involved in providing security to a cloud user based on the service chosen, according to one or more embodiments. In one or more embodiments, operation 902 may involve checking as to whether user authentication is chosen by the cloud user as part of the cloud security service provided by the service provider. In one or more embodiments, if yes, operation 904 may involve checking as to whether platform attestation is chosen by the cloud user as part of the cloud security service. In one or more embodiments, if yes, operation 906 may involve checking as to whether the user has chosen to receive the encrypted form of the signature data of storage controller 404 associated therewith. In one or more embodiments, if yes, operation 908 may involve checking as to whether the user has chosen to receive parameters other than the parameters associated with the signature data.

In one or more embodiments, if yes, operation 910 may involve the user receiving the encrypted form of the signature data and parameters other than the parameters associated with the signature data, as per the service agreement, along with the platform attestation success/failure confirmation and the user being subjected to a hardware/software based authentication process depending on the service chosen. In other word, the aforementioned data may be transmitted from cloud manager 220 (or, authentication server 402) to the user (e.g., client 602). In one or more embodiments, as discussed above, the encrypted form of the signature data received by the user may, again, depend on the service level opted for by the user. In one or more embodiments, if the result of operation 908 is a no, operation 912 may involve the user receiving the encrypted form of the signature data alone, along with the platform attestation success/failure confirmation and the user being subjected to the hardware/software based authentication process. In one or more embodiments, if the result of operation 906 is a no, operation 914 may involve the user merely receiving the platform attestation success/failure confirmation, as discussed above, along with the user being subjected to the hardware/software based authentication process. Again, in one or more embodiments, the relevant data may be transmitted to the user (e.g., client 602) from cloud manager 220 (or, authentication server 402), as per the service agreement.

In one or more embodiments, if the result of operation 904 is a no, operation 916 may involve the user merely being authenticated through software or hardware based means, depending on the service chosen. In one or more embodiments, if the result of operation 902 is a no, the user may not have opted for cloud security as a service, thereby implying the termination of the process. It is obvious that other ways of providing security to the user through the service provider and/or variations in implementations thereof are within the scope of the exemplary embodiments.

In one or more embodiments, in order to enforce the security based service agreements discussed above and to enforce billing on the basis of the provided security service, the cloud manager (e.g., cloud manager 220) may need to be modified. In one or more embodiments, cloud manager 220 may enforce billing through a debit-credit mechanism, whereby the price associated with service(s) requested for in the service agreement may be regarded as a "debit" amount, or, the amount that is billed to the user/customer. In one or more embodiments, the implementation of the debit-credit mechanism may include storing the cost(s) (e.g., as part of a data structure associated with the user) associated with the levels of security provided to the user/customer in a database associated with cloud manager 220. In one or more embodiments, an amount associated with the security service to the user may then be automatically added (e.g., by accessing and updating the data structure) as a "debit" amount associated with the security service invoice to the user.

In one or more embodiments, whenever there is an interruption of service, impossibility of service, denial of service and/or a violation of the service agreement (e.g., accidentally through the service provider), cloud manager 220 may "credit" the amount to the user/customer. In other words, in one or more embodiments, the amount that corresponds to the interruption of service, impossibility of service, denial of service and/or the violation of the service agreement may be subtracted from the "debit" amount. For example, the amount of security information requested by the user/customer (or, preferred security information) may be compared (e.g., through a processor) to the actual security information transmitted to the user/customer. If the preferred security information and the actual security information do not correspond, an amount corresponding to the lack of correspondence may be determined (e.g., by prorating the cost(s) by accessing the data structure) and subtracted from the "debit" amount. In one or more embodiments, the consolidated bill for the user may, thus, be generated through cloud manager 220.

In an example scenario, the service agreement between the service provider and the user/customer may include the user/customer obtaining platform information of a storage controller associated therewith. When the user/customer is unable to receive the aforementioned platform information due to failure of infrastructure equipment maintained by the service provider, the cost associated with obtaining the platform information may be refunded to the user/customer through the debit-credit mechanism discussed above. As discussed above, the cost associated with obtaining the platform information may be stored in the database associated with cloud manager 220. The cost may be preset/predetermined based on the quantity of infrastructure equipment (e.g., computing device(s)) being utilized by the platform determination process and/or the time of utilization thereof. The preset/predetermined cost(s) associated with processes requiring to be initiated through all the security levels of customer access may be determined by the storage provider and stored a database as a reference.

Failure of the infrastructure equipment may, again, be determined through comparing the security information transmitted to the user/customer with the preferred security information because the differences therein correspond to the utilization of an appropriate infrastructure equipment or a lack thereof. Alternately, status information associated with infrastructure equipment configured to be utilized during the procurement of the security information may be transmitted to the computing system associated with cloud manager 220 upon polling thereof through cloud manager 220. If the status information transmitted to the computing system associated with cloud manager 220 indicates a failure, the data structure associated with the security service invoice to the user/customer may be appropriately updated.

Figure 10:
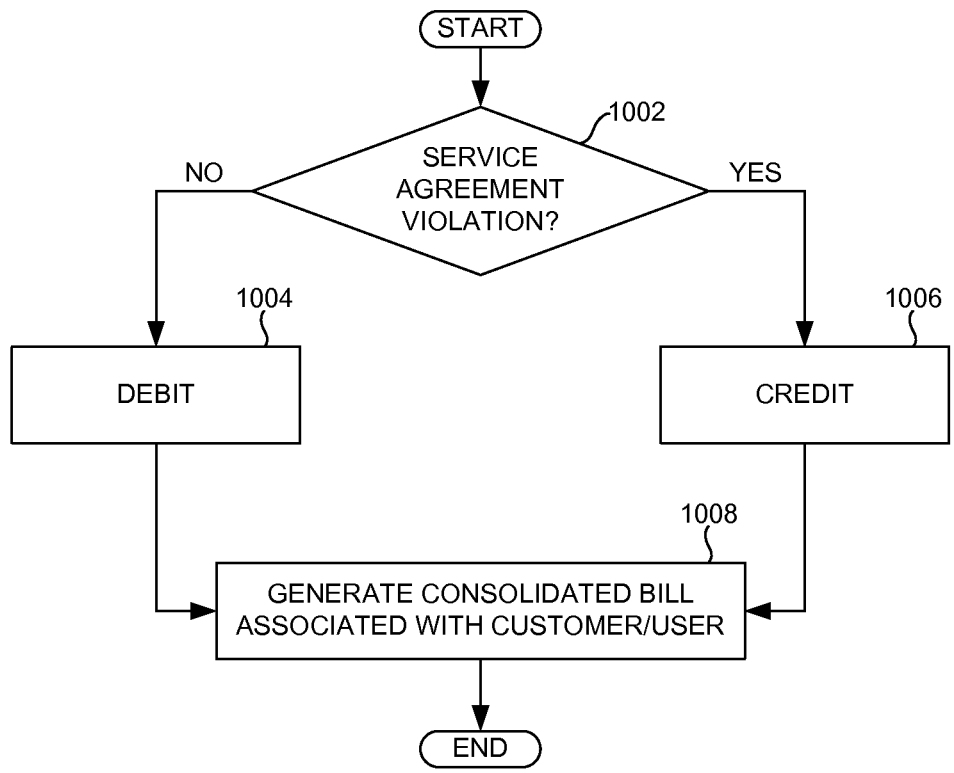
FIG. 10 is a flowchart detailing the operations involved in generating a customer/user bill for providing cloud storage security thereto, according to one or more embodiments.

FIG. 10 shows a flowchart detailing the operations involved in generating a customer/user bill, according to one or more embodiments. In one or more embodiments, operation 1002 may involve checking for a service agreement violation (e.g., by comparing the preferred security information of the storage controller with actual security information transmitted to the customer), the service agreement being between the user and the service provider. In one or more embodiments, if there is no service agreement violation, operation 1004 may involve debiting the amount associated with the service requested by the user. In one or more embodiments, if there is a service agreement violation, operation 1006 may involve crediting the amount associated with the violation (e.g., denial of service, interruption of service). In one or more embodiments, operation 1008 may then involve generating a consolidated bill associated with the customer/user through subtracting the credit amount from the debit amount.

Figure 11:
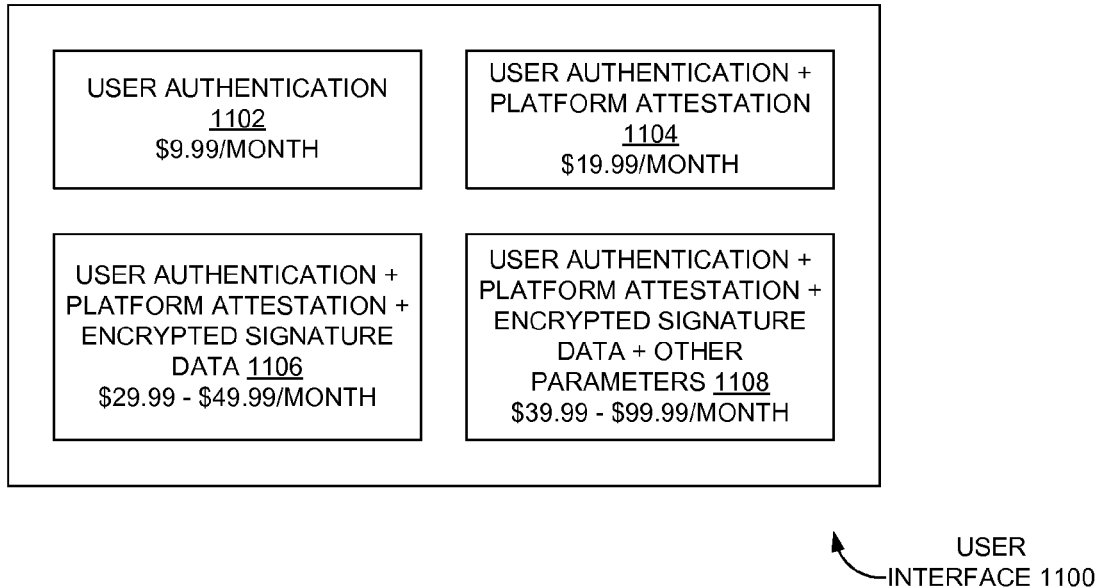
FIG. 11 is a user interface 1100 view listing the options associated with providing security to a cloud customer/user through a cloud service provider, according to one or more embodiments.

In one or more embodiments, the abovementioned consolidated bill may be generated periodically (e.g., monthly) based on the customer/user preference and/or the policy of the service provider. It is obvious that the abovementioned method of generating the customer/user bill is merely an example and that other variations thereof are within the scope of the exemplary embodiments. For example, the user may be provided an interface to view the list of options provided by the service provider associated with security in the cloud environment. FIG. 11 shows an example user interface 1100 (e.g., provided through cloud manager 220) listing the options associated with providing security to the customer/user through the service provider, according to one or more embodiments. In one or more embodiments, as shown in FIG. 11, user interface 1100 may provide options such as user authentication 1102, user authentication+platform attestation 1104, user authentication+platform attestation+encrypted signature data (e.g., of storage controller 404 associated with the customer/user) 1106 and user authentication+platform attestation+encrypted signature data+other parameters 1108. In one or more embodiments, the cost per month associated with each of the aforementioned options is also shown in FIG. 11.

In the example embodiment of FIG. 11, mere user authentication 1102 may cost $9.99/month, user authentication+platform attestation 1104 may cost $19.99/month, and user authentication+platform attestation+encrypted signature data 1106 may cost $29.99-$49.99/month, depending on the parameters requested in the encrypted signature data. For example, the customer/user (e.g., system administrator at the client side) may click the virtual representation of the options (e.g., user authentication+platform attestation+encrypted signature data 1106) in user interface 1100 and then choose the parameters desired. User authentication+platform attestation+encrypted signature data+other parameters 1108 may cost $39.99-$99.99/month, depending on both the parameters requested in the encrypted signature data and the other parameters chosen. Again, the customer/user may click the virtual representation of the appropriate options in user interface 1100 (e.g., user authentication+platform attestation+encrypted signature data 1106, user authentication+platform attestation+encrypted signature data+other parameters 1108) and then choose the parameters desired.

As cost(s) associated with the security levels of service may be stored in the database associated with cloud manager 220, whenever a user/customer initiates the process of procuring security information of the storage controller associated therewith, the user/customer may first be authenticated based on an identifier thereof, following which the appropriate security level of access may be retrieved. If the user/customer is not authenticated, he/she is prevented from receiving any security information through cloud manager 220. When authenticated, the user/customer may be serviced based on the corresponding security level of service. As use of infrastructure equipment involved in the levels of service may vary (e.g., authentication server 402 being utilized more in a higher level of service than a lower level), the invoice associated with the user/customer may be appropriately generated through the debit/credit mechanism discussed above.

In one or more embodiments, the user may pay for the service through credit card, debit card, check etc. Again, the abovementioned option of billing/providing options to the user/customer is merely an example, and alternatives are within the scope of the exemplary embodiments. For example, the user/customer may be provided options through snail mail or a company promotional offer. The user may receive statement(s) associated with the consolidated bill periodically (e.g., monthly) through e-mail or snail mail. The user/customer may also pay for an immediate service, i.e., the user authentication, platform attestation, reception of encrypted signature data may be an immediate "pay and receive" process.

The term "user/customer" has been used above to denote an entity. The entity may be a company, corporation, university, non-profit organization etc. The entity may even be an individual. The entity may also be an organization that sponsors an individual (e.g., a university sponsoring a student). In one or more embodiments, the security based service agreement discussed above may be combined with other service agreement(s) (e.g., Internet/e-mail service). For example, an Internet service provider may also provide cloud storage for the user/customer, and may decide on a security based service agreement therefor. In another scenario, an individual user may have a salary account with a bank (e.g., bank ABCD). The individual user may also have an e-mail account with bank ABCD. Thus, if bank ABCD opts for cloud security service agreements, the individual user may also be bound thereto.

In one or more embodiments, when cloud manager 220 (or, authentication server 402) receives a request for security related service(s), authentication server 402 may be configured to verify the request for eligibility of the user to receive the appropriate service associated therewith. In one or more embodiments, authentication server 402 may be configured to act as per the request, i.e., configured to enable cloud manager 220 respond to the user appropriately. In other words, as shown in FIG. 6, authentication server 402 may be configured to transmit data in accordance with the user request to cloud manager 220. Cloud manager 220 may then transmit the data to the user (e.g., client 602), as discussed with reference to FIG. 6.

In one or more embodiments, if the user is found ineligible, an error message may be transmitted from authentication server 402/cloud manager 220 to the user. In one or more embodiments, cloud manager 220 may have a database (not shown) associated therewith that includes user information such as the tier of service associated with the user/consumer (e.g., client 602). In one or more embodiments, the tier of service requested may be paid for by the user/customer. In one or more embodiments, the verification of user (e.g., client 602) information by authentication server 402 may be performed utilizing the aforementioned database.

In one or more embodiments, as discussed above, the security based service agreement may be combined with one or more other service agreement(s). In an example embodiment, the user may have entered into a performance based service agreement (e.g., SLA) with a service provider, who may offer load balancing of vserver(s) as a service option. Thus, the user may reap the benefits of optimum performance along with a secure cloud environment based on the two security agreements entered into.

Figure 12:
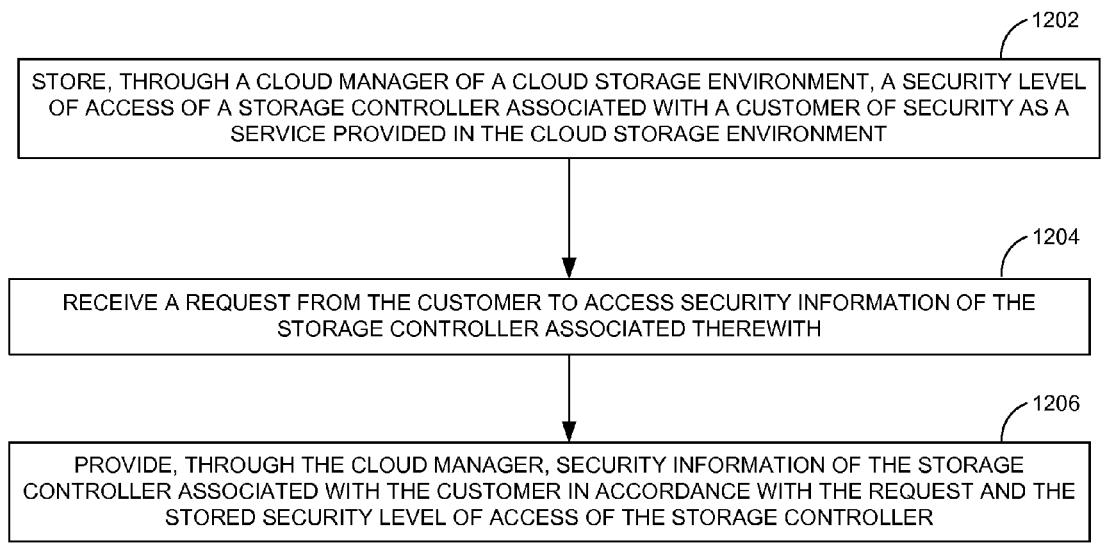
FIG. 12 is a process flow diagram detailing the operations involved in a method of providing security as a service in a cloud environment, according to one or more embodiments.

FIG. 12 shows a process flow diagram detailing the operations involved in a method of providing security as a service in a cloud environment (e.g., cloud environment 200), according to one or more embodiments. In one or more embodiments, operation 1202 may include storing, through cloud manager 220, a security level of access of a storage controller associated with a customer (e.g., client 602) of the security as a service. In one or more embodiments, cloud manager 220 may be configured to provision storage in the cloud storage environment. In one or more embodiments, operation 1204 may include receiving a request from the customer to access security information of the storage controller associated therewith. In one or more embodiments, operation 1206 may then involve providing, through cloud manager 220, security information of the storage controller associated with the customer in accordance with the request and the stored security level of access of the storage controller associated with the customer.

Figure 13:
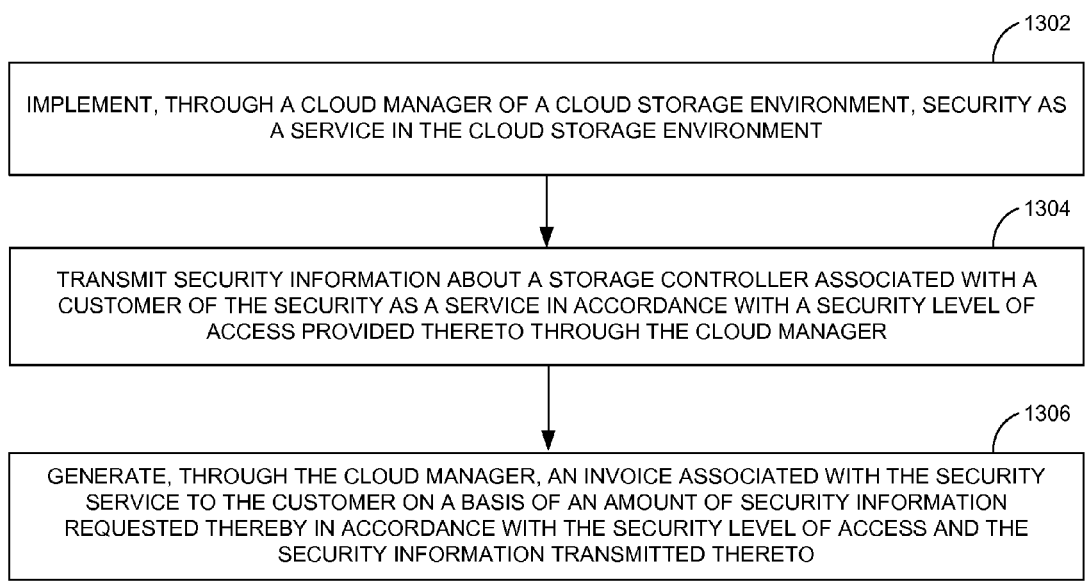
FIG. 13 is a process flow diagram detailing the operations involved in a method of transacting a storage security service in a cloud environment, according to one or more embodiments.

FIG. 13 shows a process flow diagram detailing the operations involved in a method of transacting a storage security service in a cloud environment (e.g., cloud environment 200), according to one or more embodiments. In one or more embodiments, operation 1302 may include implementing, through a cloud manager (e.g., cloud manager 220) of the cloud storage environment, security as a service in the cloud storage environment. In one or more embodiments, the cloud manager may be configured to provision storage in the cloud storage environment.

In one or more embodiments, operation 1304 may involve transmitting, to a customer (e.g., client 602) of the security service, security information about a storage controller associated therewith (e.g., client 602) in accordance with a security level of access provided thereto through the cloud manager. In one or more embodiments, operation 1306 may then involve generating, through the cloud manager, an invoice associated with the security service to the customer on a basis of an amount of security information requested thereby in accordance with the security level of access and the security information transmitted thereto.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method of providing security as a service in a cloud storage environment, comprising:
   storing, through a cloud manager of the cloud storage environment, a security level of access of a storage controller associated with a customer of the security as a service, the cloud manager configured to provision storage in the cloud storage environment;
   receiving a request from the customer to access security information of the storage controller associated therewith; and
   providing, through the cloud manager, security information of the storage controller associated with the customer in accordance with the request and the stored security level of access of the storage controller associated with the customer,
   wherein the cloud manager comprises one or more computers.

2. The method of claim 1, further comprising controlling access to the security information of the storage controller associated with the customer through verifying the security level of access thereof.

3. The method of claim 1, wherein the security information of the storage controller associated with the customer includes at least one of information associated with authenticating the customer, attestation confirmation of a computing platform on which data associated with the customer is configured to be stored, signature data of the storage controller associated with the computing platform attestation and at least one parameter other than the signature data of the storage controller.

4. The method of claim 2, wherein verifying the security level of access of the storage controller comprises:
   authenticating the customer based on an identifier thereof; and
   retrieving the security level of access associated with the customer from the cloud manager.

5. The method of claim 4, further comprising preventing access to the security information associated with the storage controller upon a failure of the authentication of the customer.

6. The method of claim 1, further comprising generating, through the cloud manager, a security service invoice to the customer based on the security information provided thereto.

7. The method of claim 6, further comprising:
   retrieving preferred security information of the storage controller associated with the customer based on the security level of access associated therewith; and
   decreasing an amount from the security service invoice when the security information provided to the customer fails to conform with the preferred security information.

8. The method of claim 1, further comprising providing at least one of network as a service, performance as a service, storage space as a service, cloud monitoring as a service, engineering support as a service, cloud auto-scaling as a service, and server utilization as a service to the customer, through the cloud manager, in addition to the security service.

9. The method of claim 3,
   wherein information associated with authenticating the customer is obtained through one of a hardware based authentication scheme and a software based authentication scheme provided through the cloud manager, and
   wherein the information associated with authenticating the customer includes a confirmation that the storage controller associated with the customer is secure.

10. The method of claim 3, wherein the signature data of the storage controller includes a list of hashes of at least one of a version of the Basic Input/Output System (BIOS) on the storage controller, a storage operating system version executing on the storage controller, a physical hardware identification attribute of the storage controller and a configuration information associated with the storage controller.

11. The method of claim 9, wherein the hardware based authentication scheme includes:
   registering the storage controller with an authentication server configured to be set up in the cloud storage environment; and
   authenticating the storage controller based on a communication protocol between a client device associated with the customer, the authentication server and the storage controller.

12. The method of claim 11, further comprising:
   interfacing a secure microcontroller with the storage controller;
   rendering a BIOS on the storage controller to be aware of a hardware associated with the secure microcontroller; and
   communicating with the authentication server through an application configured to be aware of the hardware associated with the secure microcontroller during the registration and the authentication of the storage controller, the application being configured to communicate with the secure microcontroller and the BIOS on the storage controller through an appropriate device driver.

13. The method of claim 11, further comprising:
   configuring the storage controller with a signature data of the authentication server, the authentication server also being configured to be interfaced with a secure microcontroller configured to store the signature data thereof; and
   configuring the authentication server with the signature data of the storage controller
   prior to registering the storage controller with the authentication server.

14. A method of transacting a storage security service in a cloud storage environment comprising:
   implementing, through a cloud manager of the cloud storage environment, security as a service in the cloud storage environment, the cloud manager being configured to provision storage in the cloud storage environment;

transmitting, to a customer of the security as a service, security information about a storage controller associated therewith in accordance with a security level of access provided thereto through the cloud manager; and generating, through the cloud manager, an invoice associated with the security service to the customer on a basis of an amount of security information requested thereby in accordance with the security level of access and the security information transmitted thereto, wherein the cloud manager comprises one or more computers.

15. The method of claim 14, wherein the security information about the storage controller associated with the customer includes at least one of information associated with authenticating the customer, attestation confirmation of a computing platform on which data associated with the customer is configured to be stored, signature data of the storage controller associated with the computing platform attestation and at least one parameter other than the signature data of the storage controller.

16. The method of claim 14, further comprising providing at least one of network as a service, performance as a service, storage space as a service, cloud monitoring as a service, engineering support as a service, cloud auto-scaling as a service, and server utilization as a service to the customer, through the cloud manager, as part of the service agreement, in addition to the security service.

17. The method of claim 15, wherein information associated with authenticating the customer is obtained through one of a hardware based authentication scheme and a software based authentication scheme provided through the service provider.

18. The method of claim 15, wherein the signature data of the storage controller includes a list of hashes of at least one of a version of the BIOS on the storage controller, a storage operating system version executing on the storage controller, a physical hardware identification attribute of the storage controller and a configuration information associated with the storage controller.

19. The method of claim 14, further comprising decreasing an amount from the security service invoice when the security information transmitted to the customer fails to correspond to the amount of security information requested by the customer in accordance with the security level of access.

20. The method of claim 17, wherein the hardware based authentication scheme includes:
registering the storage controller with an authentication server configured to be set up in the cloud storage environment; and
authenticating the storage controller based on a communication protocol between a client device associated with the customer, the authentication server and the storage controller.

21. A cloud storage environment providing security as a service, comprising:
a client device associated with a customer of the security as a service;
a storage controller configured to host at least one server associated with the customer; and
a cloud manager comprising one or more computers configured to provision storage associated with the client device in the cloud storage environment, the cloud manager further being configured to:

enable storage of a security level of access of the storage controller associated with the customer in a database associated therewith,
receive a request from the customer to access security information of the storage controller, and
provide security information of the storage controller associated with the customer in accordance with the request and the stored security level of access of the storage controller associated with the customer.

22. The cloud storage environment of claim 21, wherein the security information about the storage controller includes at least one of information associated with authenticating the customer, attestation confirmation of a computing platform on which data associated with the customer is configured to be stored, signature data of the storage controller associated with the computing platform attestation and at least one parameter other than the signature data of the storage controller.

23. The cloud storage environment of claim 21, wherein the cloud manager is further configured to generate a security service invoice to the customer based on the security information provided thereto.

24. The cloud storage environment of claim 23, wherein the cloud manager is further configured to:
retrieve preferred security information of the storage controller associated with the customer from the database based on the security level of access associated therewith, and
decrease an amount from the security service invoice when the security information provided to the customer fails to conform with the preferred security information.

25. The cloud storage environment of claim 22,
wherein the cloud manager is configured to enable procurement of information associated with authenticating the customer through one of a hardware based authentication scheme and a software based authentication scheme provided therethrough, and
wherein the information associated with authenticating the customer includes a confirmation that the storage controller associated with the customer is secure.

26. The cloud storage environment of claim 22, wherein the signature data of the storage controller includes a list of hashes of at least one of a version of the BIOS on the storage controller, a storage operating system version executing on the storage controller, a physical hardware identification attribute of the storage controller and a configuration information associated with the storage controller.

27. The cloud storage environment of claim 22, further comprising a computer network configured to enable communication between the client device and the cloud manager.

28. The cloud storage environment of claim 23,
wherein the storage controller comprises a secure microcontroller interfaced therewith to authenticate the computing platform, and
wherein the cloud storage environment further comprises an authentication server configured to register the storage controller and to authenticate the storage controller based on a communication protocol between the client device, the storage controller and the authentication server.

* * * * *